Patented June 30, 1953

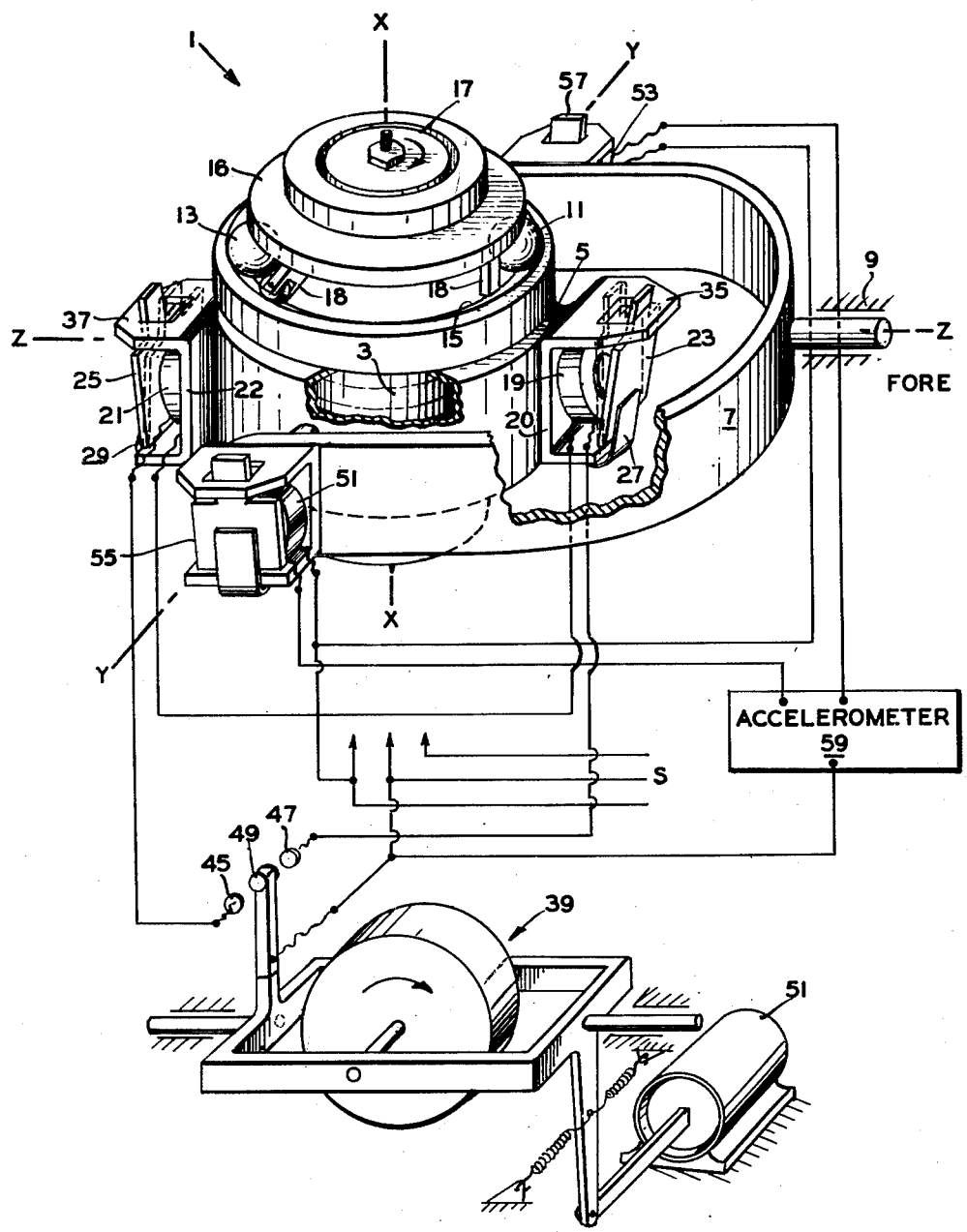

2,643,547

UNITED STATES PATENT OFFICE 2,643,547

GYROSCOPE HAVING ERECTING MEANS TO COMPENSATE FOR ACCELERATION ERRORS

Henry Konet, Hohokus, N. J., assignor to Bendix Aviation Corporation, Teterboro, N. J., a corporation of Delaware Application September 30, 1950, Serial No. 187,806

13 Claims. (Cl. 74—5.4)

1

The present invention relates to gyroscopes, and more particularly to erecting mechanism for maintaining the gyroscope spin axis in a predetermined attitude.

When a gyroscope having a gravity controlled erecting device is subjected to horizontal acceleration forces, such as occur when an aircraft flies in a curve or accelerates linearly, the erecting device responds to the dynamic vertical instead of the true vertical, and causes the rotor spin axis to assume an improper attitude. To overcome this disadvantage, the gravity controlled erecting device may be rendered inoperative about one axis while the gyroscope is subjected to horizontal acceleration forces affecting erection about that axis, and the gyroscope precesses only slowly about that axis from its predetermined attitude on account of unavoidable unbalance or friction in the bearings.

In the ball type erecting system shown and described in applicant's earlier Patent No. 2,511,273, issued June 13, 1950, wherein the gyroscope is erected about mutually perpendicular axes by one or more gravity responsive balls, it is difficult to render the erecting mechanism inoperative about only one of the axes without discontinuing erection about the other axis also.

The main object of the present invention is to compensate for errors of the erecting means due to acceleration forces about one axis by providing additional torques in response to the acceleration forces to counteract the torques exerted by the erecting device about that axis as a result of the acceleration forces.

The invention contemplates a gyroscope having an erecting system and one or more masses movable from one position to another to exert an erecting torque on the gyroscope which counteracts the torque exerted by the erecting mechanism as a result of the acceleration forces. The mass may be moved by a solenoid controlled by a rate gyroscope or by an accelerometer.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The drawing shows a gyroscope including a novel compensating erecting system constructed according to the invention.

2

Referring now to the drawing for a more detailed description of the novel compensating erecting system of the present invention, the system is shown as embodied in a gyroscope 1 having a rotor 3 rotatable in a casing 5 about a vertical spin axis X. Casing 5 is pivotally mounted in a gimbal 7 for oscillation about a horizontal pitch axis Y. The gimbal is supported by a frame 9 for oscillation about a horizontal roll axis Z perpendicular to the pitch axis. With this arrangement, the gyroscope rotor has three degrees of freedom, and the instrument, when mounted on a craft, has its pitch axis Y extending transversely of the craft and its roll axis Z extending longitudinally of the craft.

The spin axis may be precessed to the vertical by a ball erecting system shown and described in the above patent. The erecting system preferably includes a pair of balls 11, 13 arranged to roll on a track 15. The balls are driven by a head 16 rotated through a magnetic drag cup 17 or other suitable means by the rotor and having arms 18 for engaging the balls.

A pair of solenoids 19, 21 are mounted by brackets 20, 22, respectively, on opposite sides of casing 5 in alignment with the roll axis. A pair of masses 23, 25 are pivoted by resilient strips 27, 29 to brackets 20, 22 and are attracted to solenoids 19, 21, as shown in dotted lines, when the solenoids are energized to provide erecting torques which counteract the torque exerted by the erecting mechanism as a result of turn error. Resilient strips 27, 29 pivot masses 23, 25 away from solenoids 19, 21, respectively, to the position shown in solid lines when the solenoids are de-energized, and movement of the masses is limited by portions 35, 37 of brackets 20, 22, respectively.

An angular rate gyroscope 39 is mounted in the craft with its spin axis extending transversely thereof, that is, parallel to pitch axis Y. The rate gyroscope energizes one or the other of solenoids 19, 21 from power source S through fixed contacts 45, 47 and movable contact 49 when the craft turns. The angular rate gyroscope may be provided with a dash pot 51, or other suitable damping means, to prevent closing of contacts 45, 47, 49 when the craft is subjected to turbulence.

When the craft turns to the right, solenoid 19 is energized and mass 23 shifts to the dotted line position to create a torque about the gyroscope pitch axis opposing the torque exerted by the ball erecting system which otherwise would cause the gyroscope spin axis to move toward the dynamic vertical. Likewise, when the craft makes a left turn, solenoid 21 will be energized and attract mass 25 to create a torque about the gyroscope pitch axis opposing the torque exerted by the ball erecting system which otherwise would cause the gyroscope spin axis to move toward the dynamic vertical.

The gyroscope may be provided with a corresponding pair of solenoids 51, 53 and masses 55, 57 on opposite sides of gimbal 7 spaced 90 degrees from solenoids 19, 21 and masses 23, 25 and in alignment with the pitch axis. When the craft accelerates linearly, one or the other of the solenoids is energized by an accelerometer 59 and attracts the associated mass 55, 57 to provide an erecting torque about the bank axis, which counteracts the torque exerted by the erecting mechanism as a result of linear acceleration of the craft.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a gyroscope having a rotor mounted for rotation about mutually perpendicular axes and adapted to spin about an axis having a predetermined attitude, erecting means for maintaining the spin axis of the gyroscope in said predetermined attitude, and a mass movable in response to acceleration forces and substantially perpendicular thereto to provide erecting torques for counteracting the erecting torques of said means due to acceleration forces.

2. In a gyroscope having a rotor mounted for rotation about mutually perpendicular axes and adapted to spin about an axis having a predetermined attitude, a rolling ball erecting means for maintaining the spin axis of the gyroscope in said predetermined attitude, and a mass movable in response to acceleration forces and substantially perpendicular thereto for providing erecting torques to compensate for acceleration errors of the erecting means.

3. In a gyroscope having a rotor mounted for rotation about mutually perpendicular axes and adapted to spin about an axis having a predetermined attitude, erecting means for maintaining the spin axis of the gyroscope in said predetermined attitude, and a mass adapted to shift from one position to another lengthwise of the craft when the craft on which the gyroscope is mounted executes a turn to counteract the effects of the acceleration forces on the erecting means.

4. In a gyroscope having a rotor mounted for rotation about mutually perpendicular axes and adapted to spin about an axis having a predetermined attitude, erecting means for maintaining the spin axis of the gyroscope in said predetermined attitude, a mass, and a solenoid operated upon acceleration of the craft on which the gyroscope is mounted to shift said mass from one position to another and counteract the effects of the acceleration forces on the erecting means.

5. In a gyroscope having a rotor mounted for rotation about mutually perpendicular axes and adapted to spin about an axis having a predetermined attitude, erecting means for maintaining the spin axis of the gyroscope in said predetermined attitude, a pivoted mass, a solenoid for moving said mass from one position to another, and a rate gyro for operating said solenoid when the craft on which the gyroscope is mounted executes a turn, whereby said mass counteracts the effects of the turn on the erecting means.

6. In a gyroscope having a rotor mounted for rotation in a support about mutually perpendicular axes and adapted to spin about an axis having a predetermined attitude, erecting means for maintaining the spin axis of the gyroscope in said predetermined attitude, a pair of masses pivoted at opposite sides of the support, and a solenoid associated with each of said masses, and means to operate one or the other of said solenoids when the craft on which the gyroscope is mounted executes a turn to move the associated mass from one position to another to counteract the effects of the acceleration forces on the erecting means.

7. In a gyroscope having a rotor mounted for rotation in a support about mutually perpendicular axes and adapted to spin about an axis having a predetermined attitude, erecting means for maintaining the spin axis of the gyroscope in said predetermined attitude, a pair of masses pivoted at opposite sides of the support, a solenoid associated with each of said masses, and a rate gyro for operating one or the other of said solenoids when the craft on which the gyroscope is mounted executes a turn whereby said mass pivots and counteracts the effects of the turn on the erecting means.

8. In a gyroscope having a rotor mounted for rotation about mutually perpendicular axes and adapted to spin about an axis having a predetermined attitude, means for erecting the gyroscope about both of said axes to maintain the spin axis of the gyroscope in said predetermined attitude, and a mass movable in response to acceleration forces about one of said axes and perpendicular to the force for providing erecting torques about the other axis to compensate for acceleration errors of the erecting means about said one axis.

9. In a gyroscope having a rotor mounted for rotation about mutually perpendicular axes and adapted to spin about an axis having a predetermined attitude, erecting means for maintaining the spin axis of the gyroscope in said predetermined attitude, and a mass adapted to shift transversely of the craft from one position to another when the craft on which the gyroscope is mounted accelerates linearly to counteract the effects of the acceleration forces on the erecting means.

10. In a gyroscope having a rotor mounted for rotation about mutually perpendicular axes and adapted to spin about an axis having a predetermined attitude, erecting means for maintaining the spin axis of the gyroscope in said predetermined attitude, a pivoted mass, a solenoid for moving said mass from one position to another, and an accelerometer for operating said solenoid when the craft on which the gyroscope is mounted accelerates linearly, whereby said mass counteracts the effects of acceleration on the erecting means.

11. In a gyroscope having a rotor mounted for rotation in a support about mutually perpendicular axes and adapted to spin about an axis having a predetermined attitude, erecting means for maintaining the spin axis of the gyroscope in said predetermined attitude, a pair of masses pivoted at opposite sides of the support, a solenoid associated with each of said masses, and an accelerometer for operating one or the other of said solenoids when the craft on which the gyroscope is mounted accelerates linearly whereby said mass pivots and counteracts the effects of acceleration on the erecting means.

12. In a gyroscope having a rotor mounted for rotation about mutually perpendicular axes and adapted to spin about an axis having a predetermined attitude, erecting means for maintaining the spin axis of the gyroscope in said predetermined attitude, a plurality of pivoted masses disposed approximately 90 degrees from one another about the spin axis of the gyroscope, a solenoid for moving each of said masses from one position to another, means for operating one of said solenoids when the craft on which the gyroscope is mounted executes a turn, and means for operating the other solenoid when the craft on which the gyroscope is mounted accelerates linearly, whereby said masses counteract the effects of acceleration on the erecting means.

13. In a gyroscope having a rotor mounted for rotation in a support about mutually perpendicular axes and adapted to spin about an axis having a predetermined attitude, erecting means for maintaining the spin axis of the gyroscope in said predetermined attitude, a plurality of masses pivoted at opposite sides of the support and spaced from one another approximately 90 degrees, a solenoid associated with each of said masses, turn responsive means to operate one or the other of one pair of said solenoids oppositely disposed from one another when the craft on which the gyroscope is mounted executes a turn to move the associated mass from one position to another to counteract effects of the turn error on the erecting means, and acceleration responsive means to operate one or the other of the other pair of oppositely disposed solenoids when the craft accelerates linearly to move the associated mass from one position to another to counteract the effects of the acceleration forces on the erecting means.

HENRY KONET.

References Cited in the file of this patent

UNITED STATES PATENTS

| Number | Name | Date |
|---|---|---|
| 2,198,551 | Mellier | Apr. 23, 1940 |
| 2,242,806 | Wunach | May 20, 1941 |
| 2,368,644 | Curry, Jr. | Feb. 6, 1945 |
| 2,369,131 | Braddon et al. | Feb. 13, 1945 |
| 2,380,941 | Carter | Aug. 7, 1945 |
| 2,419,063 | Fischer | Apr. 15, 1947 |
| 2,501,885 | Barnes et al. | Mar. 28, 1950 |

FOREIGN PATENTS

| Number | Country | Date |
|---|---|---|
| 141,477 | Great Britain | Apr. 22, 1920 |